US 9,275,685 B2

(12) United States Patent
Demarta et al.

(10) Patent No.: US 9,275,685 B2
(45) Date of Patent: *Mar. 1, 2016

(54) SMOOTH PLAYING OF VIDEO

(75) Inventors: Stanley Peter Demarta, Pleasanton, CA (US); Peter W. Winer, Los Altos, CA (US); Rajesh Navaneethakrishnan, Santa Clara, CA (US); Jeff Sturgis, Oakland, CA (US); David Jack Ovadia, Danville, CA (US)

(73) Assignee: LinkedIn Corporation, Mountain View, CA (US)

(*) Notice: Subject to any disclaimer, the term of this patent is extended or adjusted under 35 U.S.C. 154(b) by 297 days.

This patent is subject to a terminal disclaimer.

(21) Appl. No.: 12/814,343

(22) Filed: Jun. 11, 2010

(65) Prior Publication Data

US 2011/0307782 A1 Dec. 15, 2011

(51) Int. Cl.
*G11B 27/34* (2006.01)
*G06F 9/445* (2006.01)
*G11B 27/10* (2006.01)
*H04N 21/2743* (2011.01)
*H04N 21/431* (2011.01)

(52) U.S. Cl.
CPC ............ *G11B 27/34* (2013.01); *G06F 9/44526* (2013.01); *G11B 27/102* (2013.01); *H04N 21/2743* (2013.01); *H04N 21/431* (2013.01)

(58) Field of Classification Search
USPC .......................................... 715/716, 719, 723
See application file for complete search history.

(56) References Cited

U.S. PATENT DOCUMENTS

| 5,818,446 | A | * | 10/1998 | Bertram et al. ............... 715/746 |
| 5,903,775 | A | | 5/1999 | Murray |
| 6,075,528 | A | | 6/2000 | Curtis |
| 6,134,243 | A | | 10/2000 | Jones et al. |
| 6,262,724 | B1 | | 7/2001 | Crow et al. |
| 6,393,605 | B1 | | 5/2002 | Loomans |
| 6,490,547 | B1 | | 12/2002 | Atkin et al. |
| 6,587,124 | B1 | | 7/2003 | Slaby |
| 6,671,807 | B1 | | 12/2003 | Jaisimha et al. |
| 7,159,174 | B2 | | 1/2007 | Johnson et al. |
| 7,194,743 | B2 | | 3/2007 | Hayton et al. |
| 7,460,130 | B2 | * | 12/2008 | Salganicoff ................... 345/590 |
| 7,475,112 | B2 | | 1/2009 | Sinclair et al. |
| 7,620,758 | B2 | * | 11/2009 | Hsu ................................. 710/72 |
| 7,788,583 | B1 | | 8/2010 | Amzallag et al. |
| 7,945,847 | B2 | * | 5/2011 | Bodin et al. .................. 715/203 |
| 8,112,711 | B2 | * | 2/2012 | Ackley .......................... 715/716 |
| 8,239,359 | B2 | * | 8/2012 | Barsook et al. ............... 707/706 |
| 8,261,191 | B2 | * | 9/2012 | Ording .......................... 715/719 |

(Continued)

OTHER PUBLICATIONS

ESPN.com, Lakers Rally to Beat Blazers, 100-86, Jan. 4, 2009; http://scores.espn.go.com/nba/recap?gameId=290104013; A browser window (B1-B3) showing a video clip in a web page.*

(Continued)

*Primary Examiner* — Phenuel Salomon
(74) *Attorney, Agent, or Firm* — Schwegman Lundberg & Woessner, P.A.

(57) ABSTRACT

A computer-implemented method, including detecting an event associated with an image displayed on a display device within a software application, loading a media player into the software application behind the image, where the media player is configured to play a media file associated with the image, and causing a representation of a frame of the media file to be displayed within the media player instead of the image.

15 Claims, 6 Drawing Sheets

(56) References Cited

U.S. PATENT DOCUMENTS

| | | | |
|---|---|---|---|
| 8,302,005 B2* | 10/2012 | Gibby et al. | 715/704 |
| 9,026,913 B2 | 5/2015 | Demarta et al. | |
| 2001/0007455 A1 | 7/2001 | Yoo et al. | |
| 2004/0046801 A1* | 3/2004 | Lin et al. | 345/810 |
| 2004/0104893 A1* | 6/2004 | Huang | 345/168 |
| 2005/0091597 A1* | 4/2005 | Ackley | 715/716 |
| 2005/0114717 A1* | 5/2005 | Chen | 713/300 |
| 2005/0270060 A1* | 12/2005 | Mulligan | 326/37 |
| 2006/0168015 A1* | 7/2006 | Fowler | 709/206 |
| 2007/0011200 A1* | 1/2007 | Park | 707/104.1 |
| 2007/0143414 A1* | 6/2007 | Daigle | 709/206 |
| 2007/0157228 A1* | 7/2007 | Bayer et al. | 725/34 |
| 2008/0086531 A1 | 4/2008 | Chavda et al. | |
| 2008/0162649 A1* | 7/2008 | Lee et al. | 709/206 |
| 2008/0229016 A1 | 9/2008 | Waites | |
| 2009/0006965 A1* | 1/2009 | Bodin et al. | 715/723 |
| 2009/0013048 A1* | 1/2009 | Partaker et al. | 709/206 |
| 2009/0058822 A1* | 3/2009 | Chaudhri | 345/173 |
| 2009/0207316 A1* | 8/2009 | Cupal et al. | 348/700 |
| 2010/0070483 A1* | 3/2010 | Delgo et al. | 707/706 |
| 2010/0145796 A1* | 6/2010 | Berry et al. | 705/14.49 |
| 2010/0228758 A1* | 9/2010 | Lim et al. | 707/758 |
| 2010/0251384 A1* | 9/2010 | Yen | 726/27 |
| 2011/0035669 A1* | 2/2011 | Shirali et al. | 715/716 |
| 2011/0307785 A1 | 12/2011 | Demarta et al. | |
| 2013/0167005 A1 | 6/2013 | Corbett et al. | |
| 2015/0222955 A1 | 8/2015 | Demarta et al. | |

OTHER PUBLICATIONS

"U.S. Appl. No. 12/814,347, Advisory Action mailed Nov. 21, 2013", 2 pgs.

"U.S. Appl. No. 12/814,347, Applicant's Summary of Examiner Interview filed Aug. 13, 2013", 2 pgs.

"U.S. Appl. No. 12/814,347, Examiner Interview Summary mailed Apr. 29, 2013", 3 pgs.

"U.S. Appl. No. 12/814,347, Final Office Action mailed May 30, 2013", 13 pgs.

"U.S. Appl. No. 12/814,347, Final Office Action mailed Sep. 6, 2013", 17 pgs.

"U.S. Appl. No. 12/814,347, Final Office Action mailed Oct. 18, 2012", 13 pgs.

"U.S. Appl. No. 12/814,347, Non Final Office Action mailed Feb. 4, 2013", 11 pgs.

"U.S. Appl. No. 12/814,347, Non Final Office Action mailed Jun. 5, 2014", 11 pgs.

"U.S. Appl. No. 12/814,347, Non Final Office Action mailed Jun. 20, 2012", 10 pgs.

"U.S. Appl. No. 12/814,347, Notice of Allowance mailed Jan. 9, 2015", 11 pgs.

"U.S. Appl. No. 12/814,347, Response filed Jan. 18, 2013 to Final Office Action mailed Oct. 18, 2012", 14 pgs.

"U.S. Appl. No. 12/814,347, Response filed Feb. 6, 2014 to Advisory Action mailed Nov. 21, 2013", 14 pgs.

"U.S. Appl. No. 12/814,347, Response filed May 6, 2013 to Non Final Office Action mailed Feb. 4, 2013", 13 pgs.

"U.S. Appl. No. 12/814,347, Response filed Sep. 5, 2014 to Non Final Office Action mailed Jun. 5, 2014", 11 pgs.

"U.S. Appl. No. 12/814,347, Response filed Sep. 20, 2012 to Non Final Office Action mailed Jun. 20, 2012", 12 pgs.

"U.S. Appl. No. 12/814,347, Response filed Nov. 6, 2013 to Final Office Action mailed Sep. 6, 2013", 11 pgs.

"U.S. Appl. No. 14/689,303, Non Final Office Action mailed Jul. 7, 2015", 6 pgs.

"U.S. Appl. No. 14/689,303, Preliminary Amendment filed May 27, 2015", 3 pgs.

* cited by examiner

SMOOTH PLAYING OF VIDEO

BACKGROUND OF THE INVENTION

1. Field of the Invention

Embodiments of the invention generally relate to video playback and, more specifically, to smooth playing of video.

2. Description of the Related Art

Sharing of digital media among users has evolved rapidly over the past decade. Digital video cameras can be used to capture digital videos that can be uploaded to a web server, such as a video web service, for sharing and viewing. One example of a video web service is YouTube.com. Many video sharing web sites incorporate embedded media players that are created using Adobe Flash™ software developed by Adobe Systems Incorporated.

A problem often encountered by a visitor to a web page that includes an embedded media player is a visual artifact that occurs when a media player is loaded into the web page. While the media player is being loaded, a video playback area of the media player is displayed as an all-black image. After the media player is finished loading, a first frame of the video that the media player is configured to play is displayed in the video playback area. However, the display of the all-black image comprises a visual artifact, which can be confusing or jarring to the user.

Accordingly, there remains a need in the art for an improved technique for loading a media player in a web interface.

SUMMARY

One embodiment of the invention provides a computer-implemented method, including detecting an event associated with an image displayed on a display device within a software application, loading a media player into the software application behind the image, where the media player is configured to play a media file associated with the image, and causing a representation of a frame of the media file to be displayed within the media player instead of the image.

Advantageously, embodiments of the invention provide a less jarring user experience for software applications that include an embedded media player.

DESCRIPTION OF EXAMPLE EMBODIMENTS

Embodiments of the invention provide techniques to remove the visual artifacts commonly associated with loading a media player into a web page or other software application. First, the software application is loaded with images that represent the media players. An event, such as a mouse-over event, is later detected that causes a particular image to be replaced a media player. The image remains visible over the media player while the media player is loading so that any visual artifacts associated with loading the media player are "covered up" by the image that is still displayed. After some amount of time, the image may be removed or faded away, thereby exposing the media player.

System Overview

Figure 1:
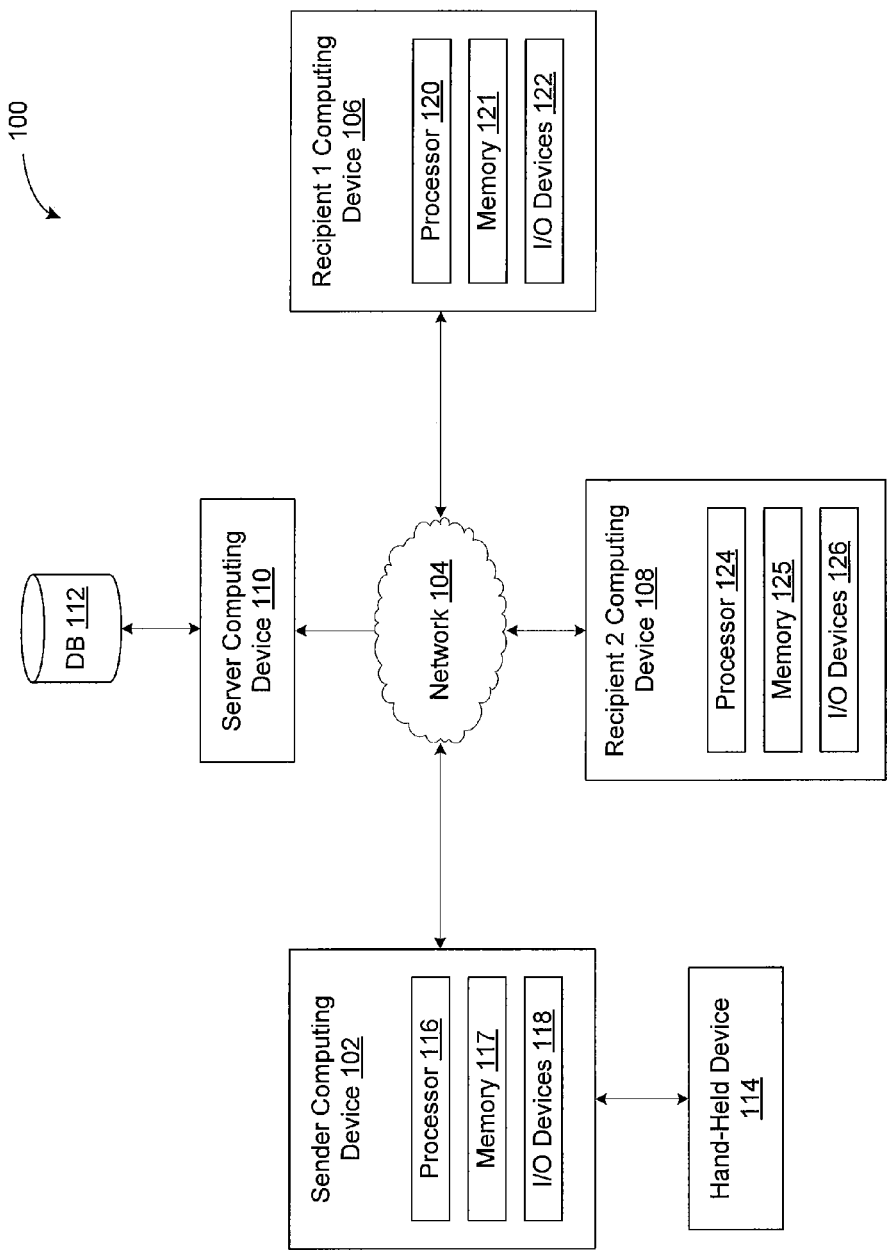
FIG. 1 is a block diagram illustrating components of a system configured to implement one or more aspects of the invention.

FIG. 1 is a block diagram illustrating components of a system 100 configured to implement one or more aspects of the invention. As shown, the system 100 includes a sender computing device 102, a network 104, a first recipient computing device 106, a second recipient computing device 108, a server computing device 110, a database 112, and a handheld device 114.

Each of the sender computing device 102, the first recipient computing device 106, the second recipient computing device 108, and the server computing device 110 may be any technically feasible type of computing system. In an alternative embodiment, the computing devices 102, 106, 108 may comprise at least one of a web-enabled television, a mobile phone, or a computer monitor that includes computing hardware, among others.

The computing devices 102, 106, 108, 110 are coupled to one another via the network 104 and may transmit and receive data across the network 104. The network 104 may be any type of network, including the World Wide Web, the Internet, a local area network (LAN), a wide area network (WAN), an intranet, a cellular network, or any other technically feasible type of network.

The sender computing device 102 includes a processor 116, a memory 117, and input/output (I/O) devices 118. The processor 116 is coupled to the I/O devices 118 and to the memory 117. The processor 116 is the primary processor of the sender computing device 102. The processor 116 may be at least one of a single-core processor, a multi-core processor, an application-specific integrated circuit (ASIC), a field-programmable gate array (FPGA), a graphics processing unit (GPU), and a combination of processing units. The processor 116 is configured to execute program instructions stored in the memory 117. The program instructions may include software applications, drivers, and/or operating systems. In one embodiment, the software application provides a user interface that allows a sender to share one or more media items with one or more recipients with a channel, as described in greater detail herein. In some embodiments, the user interface comprises a web browser.

The I/O devices 118 may include at least one of a keyboard, a mouse, a monitor, a speaker, a switch, a touchscreen, a universal serial bus (USB) port, a firewire port, a serial port, an Ethernet port, a disk drive, a flash drive, and a wireless network card, among others. In one embodiment, the I/O devices 118 are used to transmit data to and receive data from the network 104. In another embodiment, the I/O devices 118 can be used to store data in the memory 117.

The memory 117 may be any type of memory unit, including at least one of a random-access memory (RAM) unit, a dynamic RAM (DRAM) unit, a hard disk drive, and a flash memory module, among others. The memory 117 is configured to store software applications, drivers, and/or operating systems. In one embodiment, the memory 117 stores a software application that, when executed by the processor 116, provides a user interface for sharing media items with recipients.

The first recipient computing device 106 includes a processor 120, a memory 121, and I/O devices 122. The processor 120 is coupled to the I/O devices 122 and to the memory 121. The processor 120 is the primary processor of the first recipient computing device 106. The processor 120 may be a single-core processor, a multi-core processor, an ASIC, an FPGA, a GPU, or a combination of processing units. The processor 120 is configured to execute program instructions stored in the memory 121. The program instructions may include software applications, drivers, and/or operating systems. In one embodiment, the software applications include one or more programs configured to provide a user interface for a viewport in which multiple streams of shared media items are aggregated.

The I/O devices 122 may include at least one of a keyboard, a mouse, a monitor, a speaker, a switch, a touchscreen, a USB port, a firewire port, a serial port, an Ethernet port, a disk drive, a flash drive, and a wireless network card, among others. In one embodiment, the I/O devices 122 are used to transmit data to and receive data from the network 104. In another embodiment, the I/O devices 122 can be used to store data in the memory 121.

The memory 121 may be any type of memory unit, including a random-access memory (RAM) unit, a dynamic RAM (DRAM) unit, a hard disk drive, or a flash memory module, among others. The memory 121 is configured to store software applications, drivers, and/or operating systems. In one embodiment, the memory 121 stores a software application that, when executed by the processor 120, provides a user interface for receiving shared media.

The second recipient computing device 108 includes a processor 124, a memory 125, and I/O devices 126. In one embodiment, the processor 124, the memory 125, and the I/O devices 126 included in the second recipient computing device 108 are substantially similar to the processor 120, the memory 121, and the I/O devices 122, respectively, included in the first recipient computing device 106, and are not described in greater detail herein.

In the system 100 illustrated in FIG. 1, two different recipient computing devices 106, 108 are shown. In alternative embodiments, the system 100 may include one recipient computing device, or more than two different recipient computing devices. Similarly, in the system 100 illustrated in FIG. 1, one sender computing device 102 is shown. In alternative embodiments, the system 100 may include two or more different sender computing devices. In still further embodiments, a particular computing device may be both a sender computing device and a recipient computing device, as described in greater detail herein.

The server computing device 110 includes a processor, a memory, and I/O devices (none shown). Similar to the processors 116, 120, 124 included in the other computing devices 102, 106, 108 shown in FIG. 1, the processor included in the server computing device 110 is coupled to the I/O devices and to the memory. The processor is the primary processor of the server computing device 110. The processor may be at least one of a single-core processor, a multi-core processor, an ASIC, an FPGA, a GPU, and a combination of processing units. In some embodiments, the processor may be configured to execute program instructions stored in the memory. The program instructions may include software applications, drivers, and/or operating systems. In one embodiment, the software applications may include a program that allows for the sharing of one or more media items between a sender and one or more recipients via a channel.

Additional details of a computing device, such as one or more of the computing devices 102, 106, 108, 110, are described below in greater detail in FIG. 2.

As shown, the server computing device 110 is coupled to a database 112. The database 112 may be any technically feasible type of storage device, including one comprising a distributed storage architecture. In one embodiment, the database 112 stores the media items being shared between a sender and one or more recipients via channels. In some embodiments, the database 112 is included within the server computing device 110.

The hand-held device 114 may be any technically feasible type of hand-held device, including, for example, a digital video camera, a digital photo camera, or a cellular phone. In some embodiments that hand-held device 114 comprises the sender computing device 102.

Figure 2:
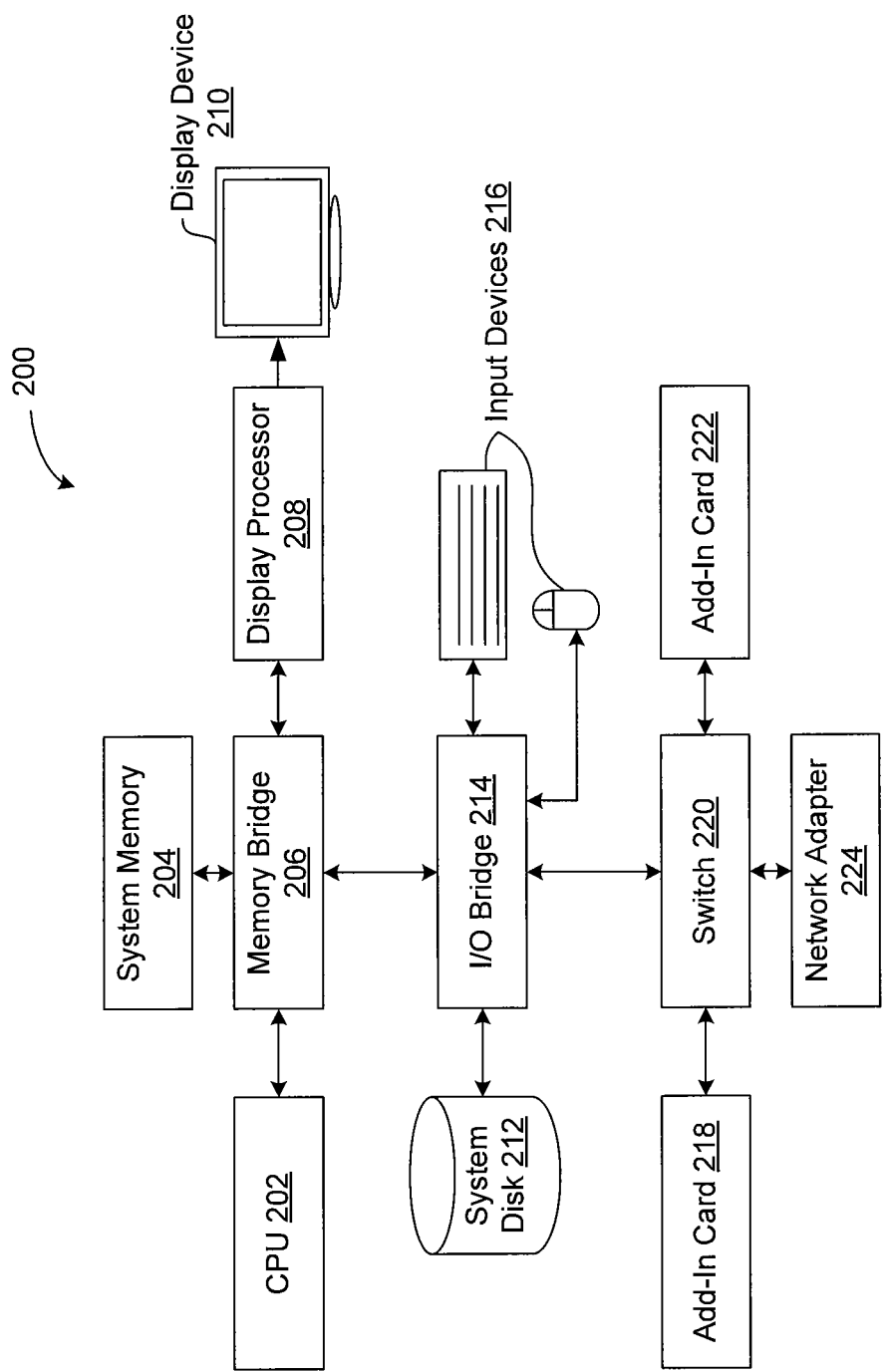
FIG. 2 is a block diagram of a computing device, according to one embodiment of the invention.

FIG. 2 is a block diagram of a computing device 200, according to one embodiment of the invention. The computing device 200 is one embodiment of a configuration of one or more of the computing devices 102, 106, 108, 110, shown in FIG. 1. Computing device 200 may be at least one of a personal computer, video game console, personal digital assistant, rendering engine, mobile phone, web-enabled TV, set-top box, and any other device suitable for practicing one or more embodiments of the invention.

As shown, computing device 200 includes a CPU 202 and a system memory 204 communicating via a bus path that may include a memory bridge 206. CPU 202 includes one or more processing cores, and, in operation, CPU 202 is the master processor of computing device 200, controlling and coordinating operations of other system components. System memory 204 stores software applications and data for use by CPU 202. CPU 202 runs software applications and optionally an operating system. Memory bridge 206, which may be, e.g., a Northbridge chip, is connected via a bus or other communication path (e.g., a HyperTransport link) to an I/O (input/output) bridge 214. I/O bridge 214, which may be, e.g., a Southbridge chip, receives user input from one or more user input devices 216 (e.g., keyboard, mouse, joystick, digitizer tablets, touch pads, touch screens, still or video cameras, motion sensors, and/or microphones) and forwards the input to CPU 202 via memory bridge 206.

A display processor 208 is coupled to memory bridge 206 via a bus or other communication path (e.g., a PCI Express, Accelerated Graphics Port, or HyperTransport link); in one embodiment display processor 208 is a graphics subsystem that includes at least one GPU and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 204.

Display processor 208 periodically delivers pixels to a display device 210 (e.g., a screen or conventional CRT, plasma, OLED, SED or LCD based monitor or television). Additionally, display processor 208 may output pixels to digital recorders adapted to reproduce computer generated images on digital media. Display processor 208 can provide display device 210 with an analog or digital signal.

A system disk 212 is also connected to I/O bridge 214 and may be configured to store content and applications and data for use by CPU 202 and display processor 208. System disk 212 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 220 provides connections between I/O bridge 214 and other components such as a network adapter 224 and various add-in cards 218 and 222. Network adapter 224 allows computing device 200 to communicate with other systems via an electronic communications network, and may include wired or wireless communication over local area networks and wide area networks such as the Internet.

Other components (not shown), including USB or other port connections, film recording devices, and the like, may also be connected to I/O bridge 214. For example, an audio processor may be used to generate analog or digital audio output from instructions and/or data provided by CPU 202, system memory 204, or system disk 212. Communication paths interconnecting the various components in FIG. 2 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 208 incorporates circuitry optimized for graphics and video processing, including, for example, video output circuitry, and constitutes a GPU. In another embodiment, display processor 208 incorporates circuitry optimized for general purpose processing. In yet another embodiment, display processor 208 may be integrated with one or more other system elements, such as the memory bridge 206, CPU 202, and I/O bridge 214 to form a system on chip (SoC). In still further embodiments, display processor 208 is omitted and software executed by CPU 202 performs the functions of display processor 208.

Pixel data can be provided to display processor 208 directly from CPU 202. In some embodiments of the present invention, instructions and/or data representing a scene are provided to a render farm or a set of server computers, each similar to computing device 200, via network adapter 224 or system disk 212. The render farm generates one or more rendered images of the scene using the provided instructions and/or data. These rendered images may be stored on computer-readable media in a digital format and optionally returned to computing device 200 for display. Similarly, stereo image pairs processed by display processor 208 may be output to other systems for display, stored in system disk 212, or stored on computer-readable media in a digital format.

Alternatively, CPU 202 provides display processor 208 with data and/or instructions defining the desired output images, from which display processor 208 generates the pixel data of one or more output images. The data and/or instructions defining the desired output images can be stored in system memory 204 or graphics memory within display processor 208.

It will be appreciated that the system shown herein is illustrative and that variations and modifications are possible. The connection topology, including the number and arrangement of bridges, may be modified as desired. For instance, in some embodiments, system memory 204 is connected to CPU 202 directly rather than through a bridge, and other devices communicate with system memory 204 via memory bridge 206 and CPU 202. In other alternative topologies, display processor 208 is connected to I/O bridge 214 or directly to CPU 202, rather than to memory bridge 206. In still other embodiments, I/O bridge 214 and memory bridge 206 might be integrated into a single chip. The particular components shown herein are optional; for instance, any number of add-in cards or peripheral devices might be supported. In some embodiments, switch 220 is eliminated, and network adapter 224 and add-in cards 218, 222 connect directly to I/O bridge 214.

Smooth Playing of Video

Figure 3:
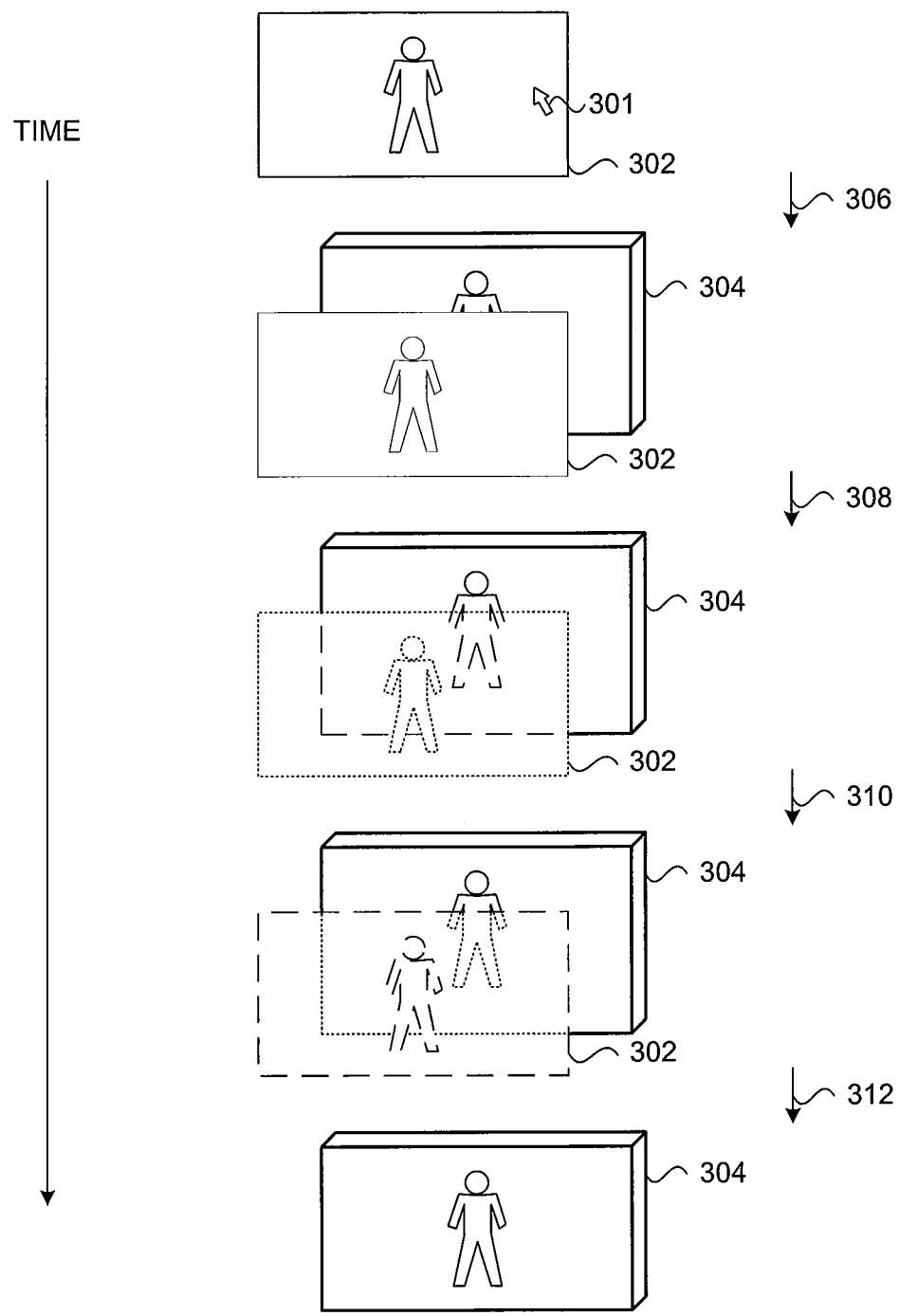
FIG. 3 is a conceptual diagram illustrating replacing an image with a media player, according to one embodiment of the invention.

FIG. 3 is a conceptual diagram illustrating replacing an image with a media player, according to one embodiment of the invention. In one embodiment, an image 302 is a digital image that depicts the media player 304. The image 302 is included in a web page that is displayed within a web browser.

In one embodiment, an event 306 occurs when a cursor 301 crosses a boundary associated with the image 302. Accordingly, the image 302 is pre-configured to detect a "mouse-enter" event, as further described in FIGS. 4A-4B and 5. The mouse-enter event causes a media player 304 to be loaded directly behind the image 302 so that a user viewing the web page is unaware of the changes occurring, i.e., that the media player 304 is loading behind the image 302. In the example shown in FIG. 3, media player 304 is shown offset to the image 302 for illustrative purposes only.

Events 308-310 depict a gradual increase of the transparency of the image 302. The event 308 occurs as the media player 304 begins loading. As shown, the image 302 is more transparent and the media player 304 begins to show through the image 302. The event 310 occurs as the loading of the media player 304 nears completion, where the image 302 is nearly entirely transparent and the media player 304 is completely visible through the image 302.

An event 312 occurs when the media player 304 has completed loading and the image 302 is no longer displayed. In one embodiment, the image 302 is removed from the web page when the media player 304 has completed loading. In other embodiments, the image is removed after a predetermined amount of time. Thus, a seamless transition between the image 302 and the media player 304 is provided, which eliminates the black "flash" that occurs when loading a media player using conventional techniques.

Figure 4A:
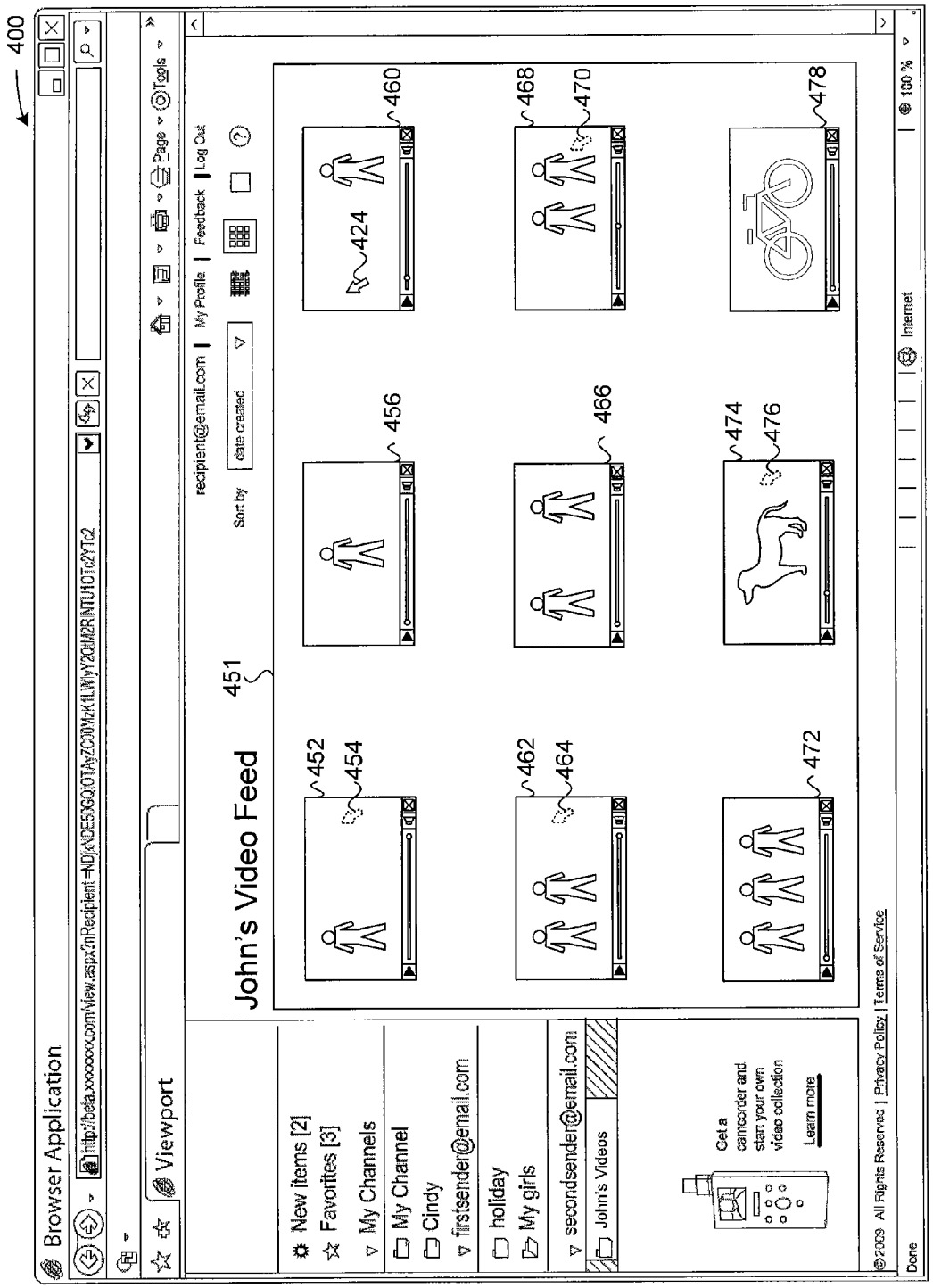
FIG. 4A is a screenshot of a web browser that is configured to load a web page that includes a viewport, according to one embodiment of the invention.

FIG. 4A is a screenshot of a web browser that is configured to load a web page that includes a viewport, according to one embodiment of the invention. As shown, viewport may be displayed in a browser application 400 that includes a video feed window 451, an active cursor 424, and previous cursors 454, 464, 470, 476. The video feed window 451 includes media players 452, 462, 468, 474, and images 456, 460, 466, 472, 478.

As shown, the images 456, 460, 466, 472, 478 are indistinguishable from the media players 452, 462, 468, 474 to a view of the web page. More specifically, the viewer of the web browser application perceives and interprets the images 456, 460, 466, 472 478 as actual media players loaded into the web page. As described herein, a mouse-enter event has not yet occurred for each of the images 456, 466, 472, 478 and, thus, these images remain displayed within the video feed window 451. By contrast, a mouse-enter event has occurred for the images that were previously located in the position of each of the media players 452, 462, 468 and 474.

The previous cursors 454, 464, 470, 476 represent the location of the mouse cursor at previous moments in time. As depicted by the previous cursors 454, 464, 470, 476, each of the corresponding media players 452, 462, 468, 474, respectively, has been "moused-over" by the cursor. As described above in FIG. 3, each image is replaced by a media player when a mouse-enter event is detected over the image. For example, the media player 452 replaced an image (not shown) when the previous cursor entered within the boundaries of the image. Thus, each of the media players 452, 462, 468, 474 were previously represented by images that have been removed subsequent to mouse-enter events. In other embodiments, an event other than a mouse-enter event may trigger an image being replaced by a media player.

Accordingly, in some embodiments, when a user navigates to a web page that is configured to implement embodiments of the invention, images are loaded for each video to be displayed in the webpage. Each image may represent a media player, where the first frame of the video to be played by a particular media player is depicted in the image.

Figure 4B:
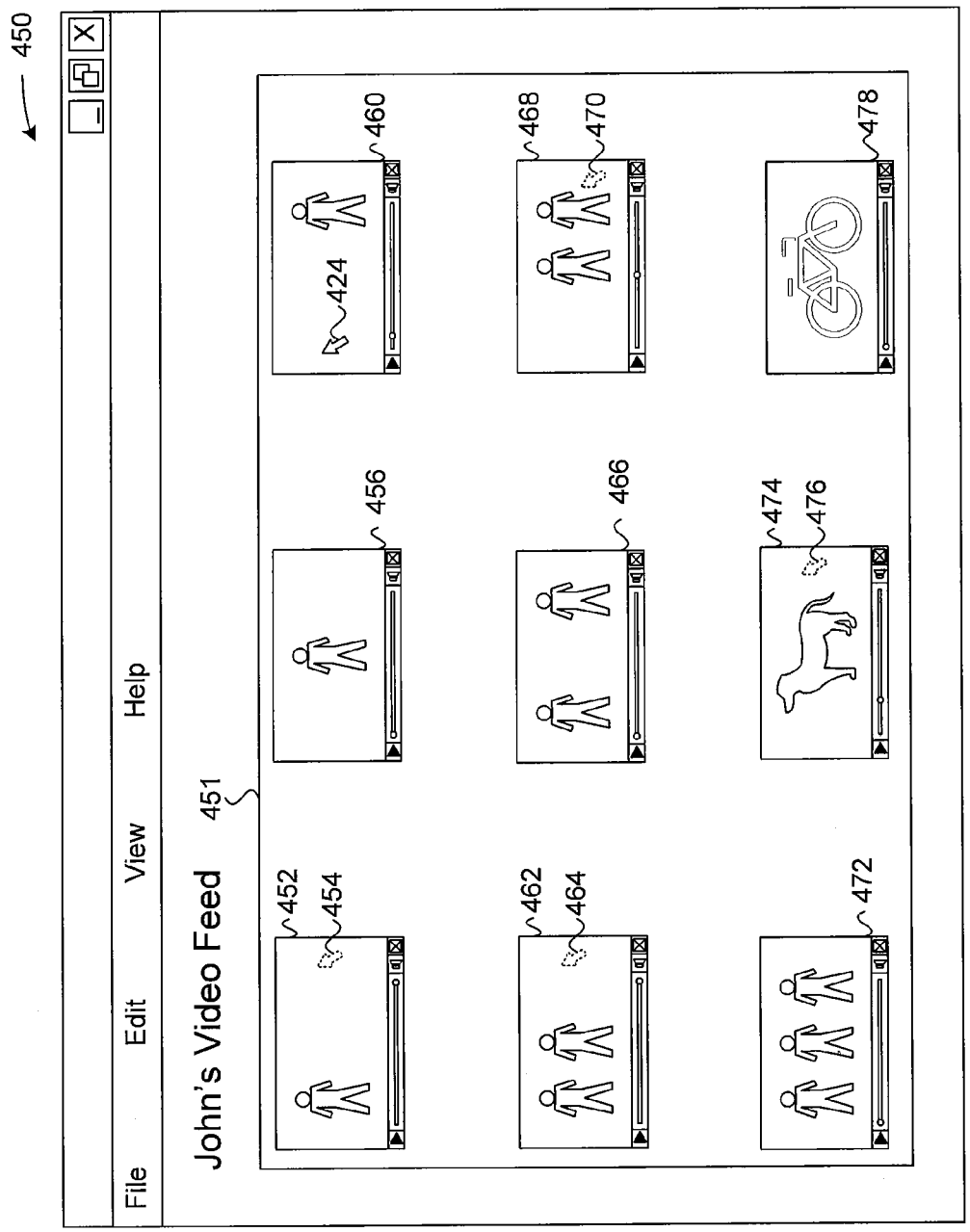
FIG. 4B is a screenshot of a software application that includes a viewport, according to one embodiment of the invention.

FIG. 4B is a screenshot of a software application that includes a viewport, according to one embodiment of the invention. As shown, viewport may be displayed in a software application window 450 that includes a video feed window 451, an active cursor 424, and previous cursors 454, 464, 470, 476. The video feed window 451 includes media players 452, 462, 468, 474, and images 456, 460, 466, 472, 478. In one embodiment, the software application window 450 is associated with a stand-alone software application, other than a web browser, installed on a computing device.

Similar to the browser application 400 shown in FIG. 4A, the images 456, 460, 466, 472, 478 are indistinguishable from the media players 452, 462, 468, 474 to a user of the software application. More specifically, the user of the software application perceives and interprets the images 456, 460, 466, 472, 478 as actual media players loaded into the software application. As described herein, a mouse-enter event has not yet occurred for each of the images 456, 466, 472, 478 and, thus, these images remain displayed within the video feed window 451. By contrast, a mouse-enter event has occurred for the images that were previously located in the position of each of the media players 452, 462, 468 and 474.

Again, the previous cursors 454, 464, 470, 476 represent the location of the mouse cursor at previous moments in time. As depicted by the previous cursors 454, 464, 470, 476, each of the corresponding media players 452, 462, 468, 474, respectively, has been "moused-over" by the cursor. As described above in FIG. 3, each image is replaced by a media player when a mouse-enter event is detected over the image. For example, the media player 452 replaced an image (not shown) when the previous cursor entered within the boundaries of the image. Thus, each of the media players 452, 462, 468, 474 were previously represented by images that have been removed subsequent to mouse-enter events. In other embodiments, an event other than a mouse-enter event may trigger an image being replaced by a media player.

Accordingly, in some embodiments, when a user loads a software application that is configured to implement embodiments of the invention, images are loaded for each video to be displayed in the software application. Each image may represent a media player, where the first frame of the video to be played by a particular media player is depicted in the image.

Figure 5:
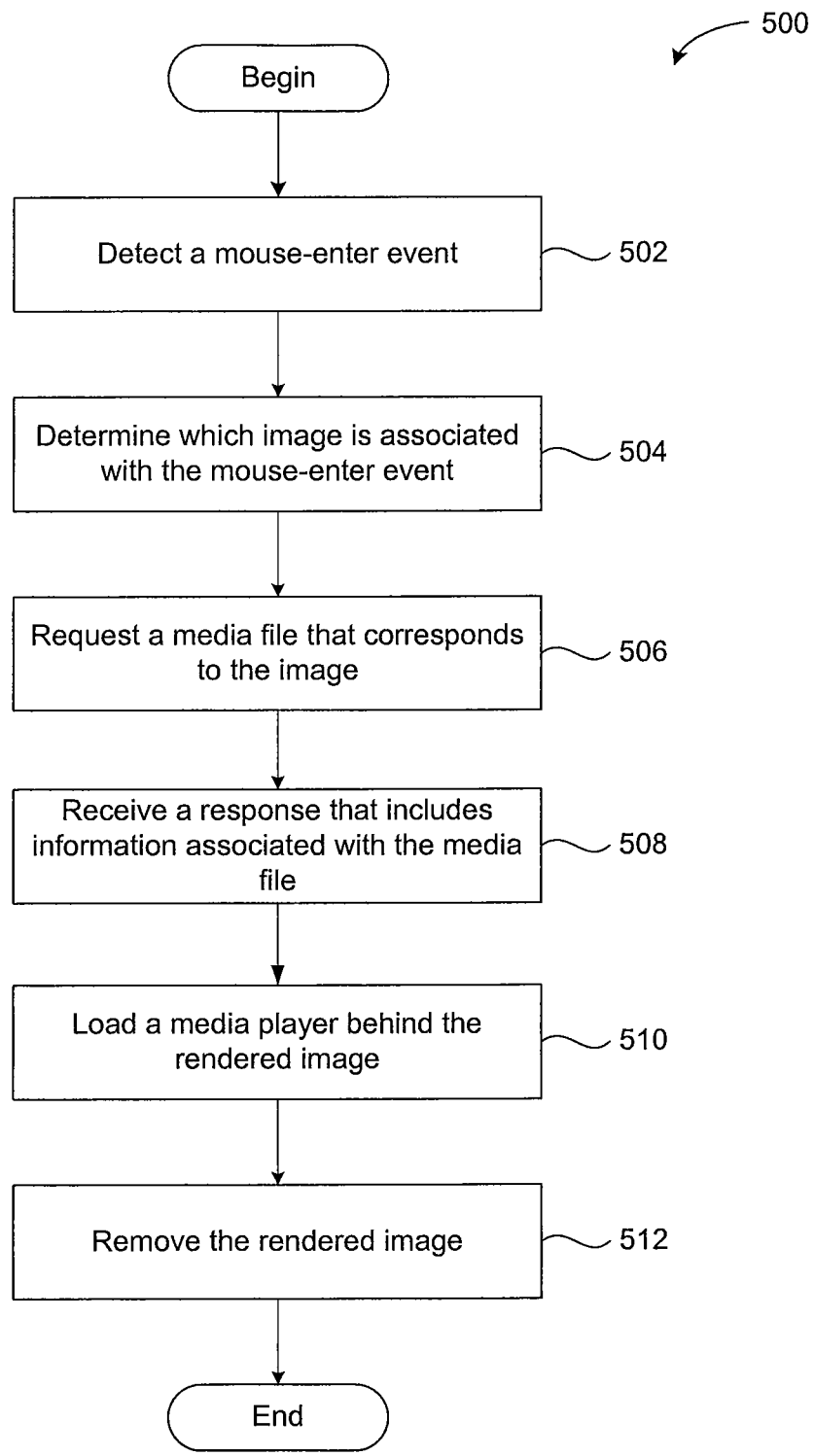
FIG. 5 is flow diagram of method steps for loading a media player, according to one embodiment of the invention.

FIG. 5 is flow diagram of method steps for loading a media player, according to one embodiment of the invention. Persons skilled in the art will understand that, even though the method 500 is described in conjunction with the systems of FIGS. 1-4B, any system configured to perform the steps of the method 500 illustrated in FIG. 5, in any order, is within the scope of the invention As shown, the method 500 begins at step 502, where a software application detects a mouse-enter event over an image. In one embodiment, the mouse-enter event is associated with a mouse cursor crossing a boundary associated with the image displayed in a web browser application or other software application. In one example, a user loads a video feed web page that includes eight rendered images that depict media players. Each image depicts a video frame extracted from a media file that is associated with the rendered image. Each image is configured to respond to a mouse-enter event. When the user directs the cursor of the mouse to an area of the web page that falls within the borders of one of the images, the browser detects the mouse-enter event and executes a subroutine associated with the mouse-enter event.

At step 504, the software application determines which image is associated with the mouse-enter event. In one embodiment, the mouse-enter event includes an event parameter that specifies a pointer to the rendered image that is causing the mouse-enter event to occur. For example, if the mouse cursor falls within the borders of the first rendered image on the web page, the event parameter includes a pointer to the first rendered image; whereas, if the mouse cursor falls within the borders of the fifth rendered image on the web page, the event parameter includes a pointer to the fifth rendered image.

At step 506, the software application determines and requests a media file that corresponds to the image associated with the mouse-enter event. In one embodiment, the software application reads data associated with the image to determine an identification (ID) of the media file that corresponds to the image. In some embodiments, the ID of the corresponding media file is stored within a title of the rendered image, where the title is an HTML field that is included in HTML web page objects including buttons, links, images, or the like. In other embodiments, the ID of the corresponding media file is stored in an invisible table that is embedded in the web page, where the HTML name field of each rendered image is linked to an ID of the corresponding media file. Upon determination of the corresponding media file ID, the software application submits a request to retrieve the appropriate media file from a server.

At step 508, the software application receives a response that includes information associated with the media file. In one embodiment, the entire media file is retrieved by the server and returned to software application. Retrieving the entire media file ensures that the playback will not be interrupted due to network connectivity issues, as is typically experienced when streaming videos. However, retrieving the entire media file increases the load time that is required before the media file can be played back. In other embodiments, a portion of the media file is retrieved by the server and returned to the software application. This technique allows the software application to quickly begin playback of the media file, however, as described above, network connectivity issues can cause delays in the delivery of the additional data associated with the media file, resulting in choppy video and frequent playback interruptions.

At step 510, the software application loads a media player behind the rendered image. In one embodiment, the software application is configured to interpret the media file to determine the media player required to play the media file. For example, if the media file is a high-definition video file, a particular video codec is often required to be loaded in addition to the media player. The format of the media file may also determine which media player is loaded into the web page.

The software application determines the position of the rendered image and loads the appropriate media player in an area of the web page that lies behind the rendered image. The rendered image remains displayed within the software application while the media player is loaded and the user is unaware of the changes that are occurring to the software application.

At step 512, the software application removes the rendered image. In one embodiment, the software application is configured to receive a callback from the media player when the media player has fully loaded into the software application, whereupon the software application removes the rendered image. The rendered image can be removed in a variety of ways, including setting the HTML visibility field of the rendered image to "false," setting the HTML transparency field of the image to full, or deleting the rendered image from the page. In one embodiment, when the image is removed, the media player is viewable to the user, where the appearance of the media player is identical to the removed rendered image. In other embodiments, a visual indication may be displayed indicating that the media player is loaded.

In some embodiments, the software application is configured to gradually increase the transparency of the rendered image as the media player is loaded into the software application. The transparency transition is set to execute over a predetermined period of time based on a load time required to load the media player. Alternatively, in other embodiments, the software application may track the loading of the media player and match the transparency of the rendered image to the load progress. The aforementioned techniques prevent the viewer from detecting any visual artifacts that normally occur when loading media players. Once the media player is loaded, a frame, such as the first frame, of the media file associated with the media player may be displayed within a playback portion of the media player. A user may then select various controls, such as Play, Pause, Fast-Forward, Rewind, and the like, included in the media player to control the playback of the media file.

In sum, embodiments of the invention provide techniques to remove the visual artifacts commonly associated with loading a media player into a web pages or other software application. First, the software application is loaded with images that represent the media players. An event, such as a mouseover event, is later detected that causes a particular image to be replaced a media player. The image remains visible over the media player while the media player is loading so that any visual artifacts associated with loading the media player are "covered up" by the image that is still displayed. After some amount of time, the image may be removed or faded away, thereby exposing the media player.

Advantageously, embodiments of the invention provide a less jarring user experience for software applications that include an embedded media player.

While the forgoing is directed to embodiments of the present invention, other and further embodiments of the invention may be devised without departing from the basic scope thereof. For example, aspects of the present invention may be implemented in hardware or software or in a combination of hardware and software. In addition, one embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

What is claimed is:

1. A computer-implemented method, comprising:
at a time no media players are loaded into computer memory, detecting an event associated with an image displayed within a web browser application on a display device, wherein the image includes a non-functional user interface of a media player superimposed on a frame of a video file, the non-functional user interface including non-functional playback, volume, and resolution controls;
in response to detecting the event:
loading the media player into computer memory and, at the same time that the media player is loading, increasing a transparency of the image from a non-transparent state in which the media player is obscured by the image, to a partially transparent state in which the media player is partially obscured by the image, and then to a fully transparent state in which the media player is not obscured by the image;
retrieving the video file; and
displaying the frame of the video file in the media player, the media player being configured to play the video file in the web browser application at a position contiguous with a position of the image; and
once the media player is fully loaded into computer memory:
removing the image from the web browser interface.

2. The method of claim 1, wherein the event comprises a mouse cursor crossing a boundary associated with the image displayed within the web browser application.

3. The method of claim 1, wherein the event comprises at least one finger of a user interacting with the image displayed within the web browser application.

4. The method of claim 1, wherein the event comprises a keyboard keystroke.

5. The method of claim 1, wherein the video file is referenced by a file identifier associated with the image.

6. The method of claim 1, wherein the image includes a first portion representing an interface associated with the media player and a second portion representing the frame of the video file.

7. The method of claim 6, wherein the second portion resides within a video playback area of the interface.

8. A computer-readable storage medium storing instructions that, when executed by a processor, cause the processor to manipulate one or more files, by performing the operations comprising:
at a time no media players are loaded into computer memory, detecting an event associated with an image displayed on a display device within a web browser application, wherein the image includes a non-functional user interface of a media player superimposed on a frame of a video file, the non-functional user interface including non-functional playback, volume, and resolution controls;
in response to detecting the event:
loading the media player into computer memory and, at the same time that the media player is loading, increasing a transparency of the image from a non-transparent state in which the media player is obscured by the image, to a partially transparent state in which the media player is partially obscured by the image, and then to a fully transparent state in which the media player is not obscured by the image;
retrieving the video file; and displaying the frame of the video file in the media player, the media player being configured to play the video file in the web browser application at a position contiguous with a position of the image; and once the media player is fully loaded into computer memory:

removing the image from the web browser interface.

9. The computer-readable storage medium of claim 8, wherein the event comprises a mouse cursor crossing a boundary associated with the image displayed within the web browser application.

10. The computer-readable storage medium of claim 8, wherein the event comprises at least one finger of a user interacting with the image displayed within the web browser application.

11. The computer-readable storage medium of claim 8, wherein the event comprises a keyboard keystroke.

12. The computer-readable storage medium of claim 8, wherein the video file is referenced by a file identifier associated with the image.

13. The computer-readable storage medium of claim 8, wherein the image includes a first portion representing an interface associated with the media player and a second portion representing the frame of the video file.

14. The computer-readable storage medium of claim 13, wherein the second portion resides within a video playback area of the interface.

15. A computing device, comprising:
a processor; and
a memory storing instructions that when executed by the processor cause the processor to perform an operation comprising:
at a time no media players are loaded into computer memory, detecting an event associated with an image displayed on a display device within a web browser application, wherein the image includes a non-functional user interface of a media player superimposed on a frame of a video file, the non-functional user interface including non-functional playback, volume, and resolution controls; and,
in response to detecting the event:
loading the media player into computer memory and, at the same time that the media player is loading, increasing a transparency of the image from a non-transparent state in which the media player is obscured by the image, to a partially transparent state in which the media player is partially obscured by the image, and then to a fully transparent state in which the media player is not obscured by the image;
retrieving the video file; and
displaying the frame of the video file in the media player, the media player being configured to play the video file in the web browser application at a position contiguous with a position of the image; and
once the media player is fully loaded into computer memory:
removing the image from the web browser interface.

\* \* \* \* \*